Sept. 29, 1959  R. F. SCHWEGLER  2,906,354
SWIVEL PLOW

Filed April 14, 1954  3 Sheets-Sheet 1

INVENTOR
ROY F. SCHWEGLER
BY: Emerson B Donnell
ATTORNEY

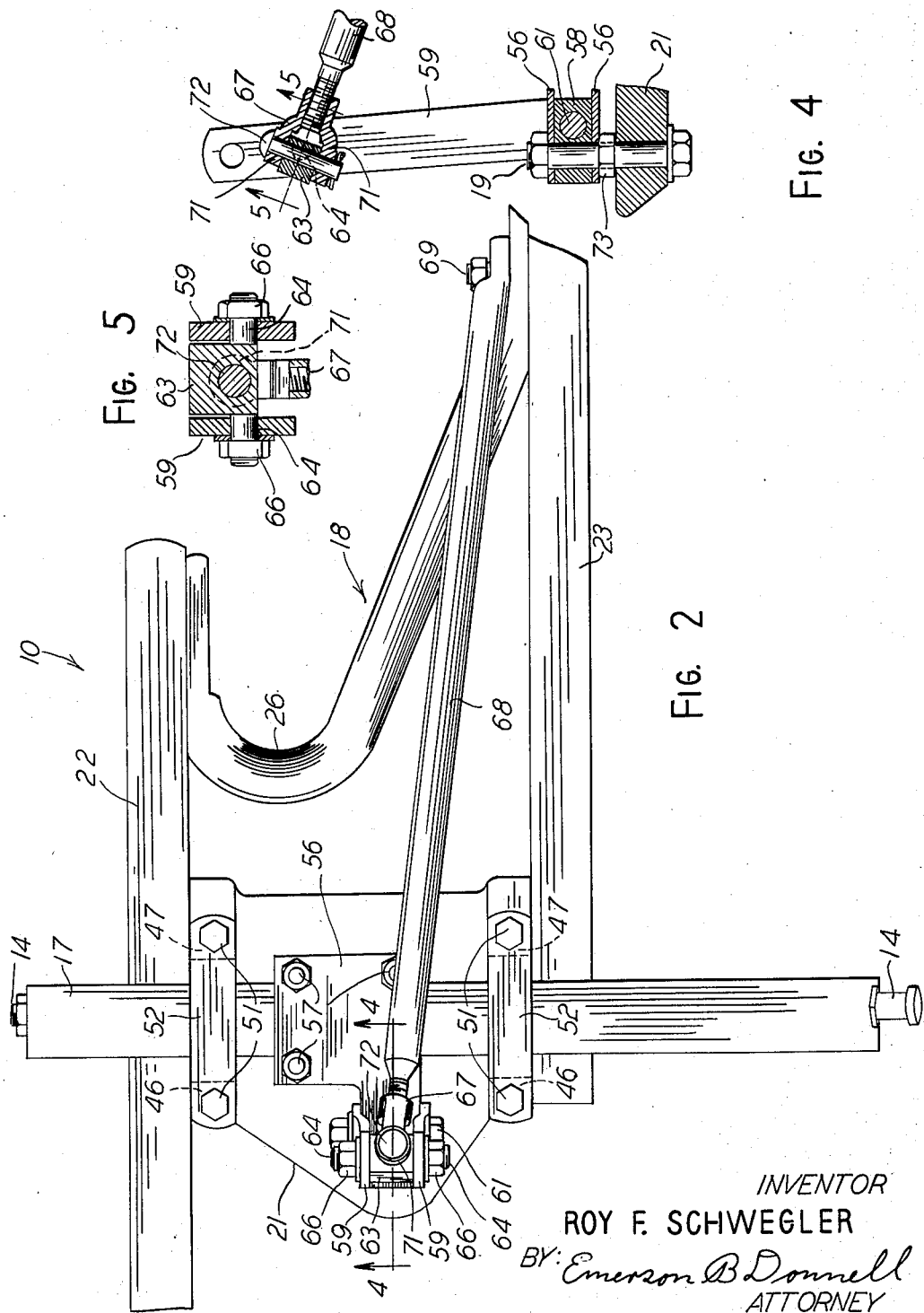

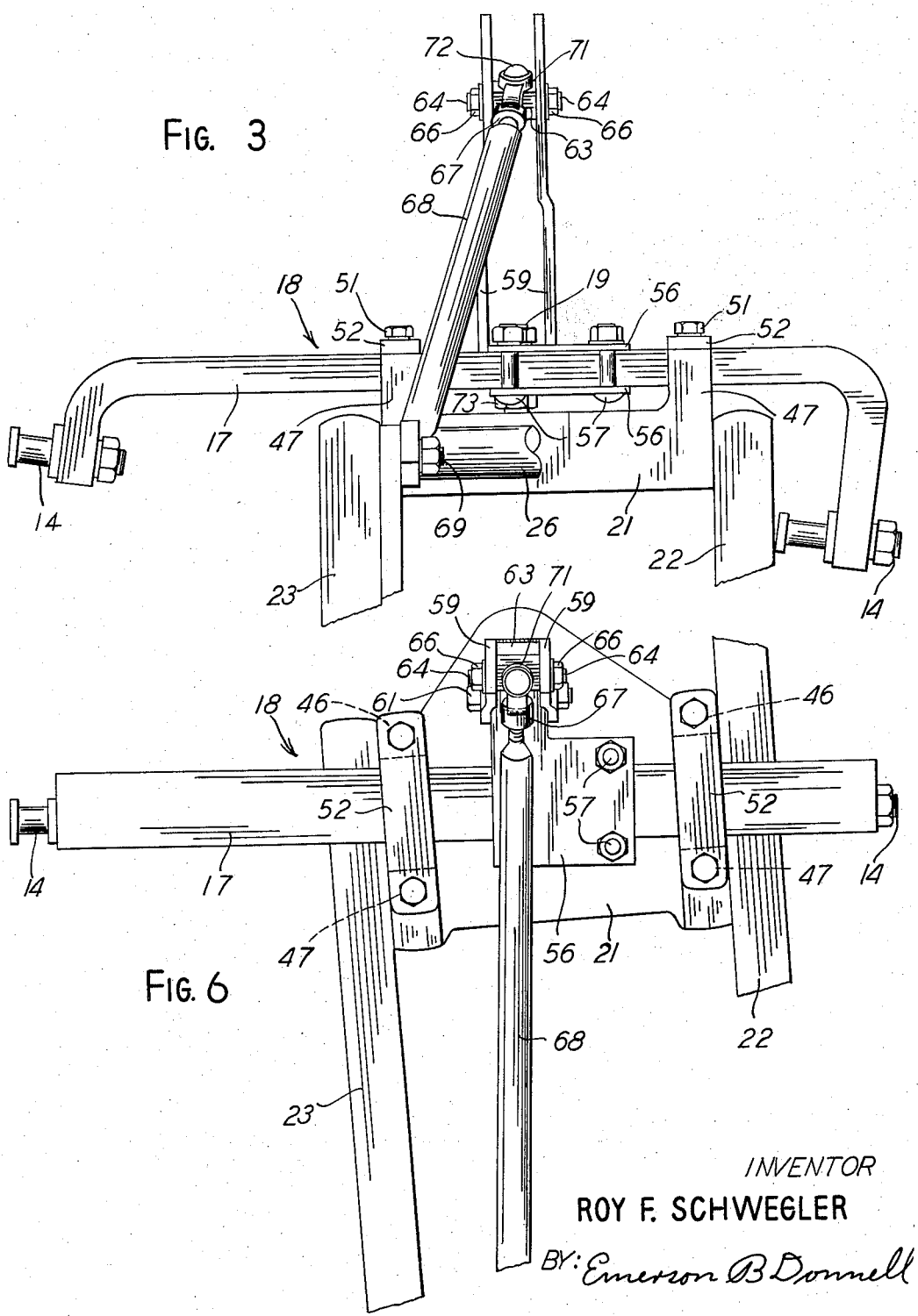

United States Patent Office 2,906,354
Patented Sept. 29, 1959

2,906,354

SWIVEL PLOW

Roy F. Schwegler, Davenport, Iowa, assignor to J. I. Case Company, Racine, Wis., a corporation of Wisconsin Application April 14, 1954, Serial No. 423,061

4 Claims. (Cl. 172—449)

This invention relates to agriculture plows, and more particularly, it relates to swivel plows.

It is a primary object of this invention to provide a plow which will swivel with respect to the tractor during plowing operations.

Another object of this invention is to provide a swivel type plow which is restricted in its swivel motion to insure that certain parts of a field will not be missed by the plow.

Still another object of this invention is to provide a plow which effects tracking of the plow bottoms relative to the tractor when plowing on a contour.

Other objects and advantages will become apparent upon reading the following description in conjunction with the accompanying drawings, wherein Fig. 1 is a side perspective view of a plow, and a fragment of an attached tractor, containing a preferred embodiment of this invention.

Fig. 2 is an enlarged top plan view of the plow embodiment shown in Fig. 1 but with the earth contacting implements removed.

Fig. 3 is a fragmentary rear elevational view of the embodiment shown in Fig. 2.

Fig. 4 is a fragmentary sectional view taken on the line 4—4 of Fig. 2.

Fig. 5 is an enlarged fragmentary sectional view taken on the line 5—5 of Fig. 4.

Fig. 6 is a fragmentary top plan view of the embodiment shown in Fig. 2 but with the swiveling parts in a different position.

Figure 1:
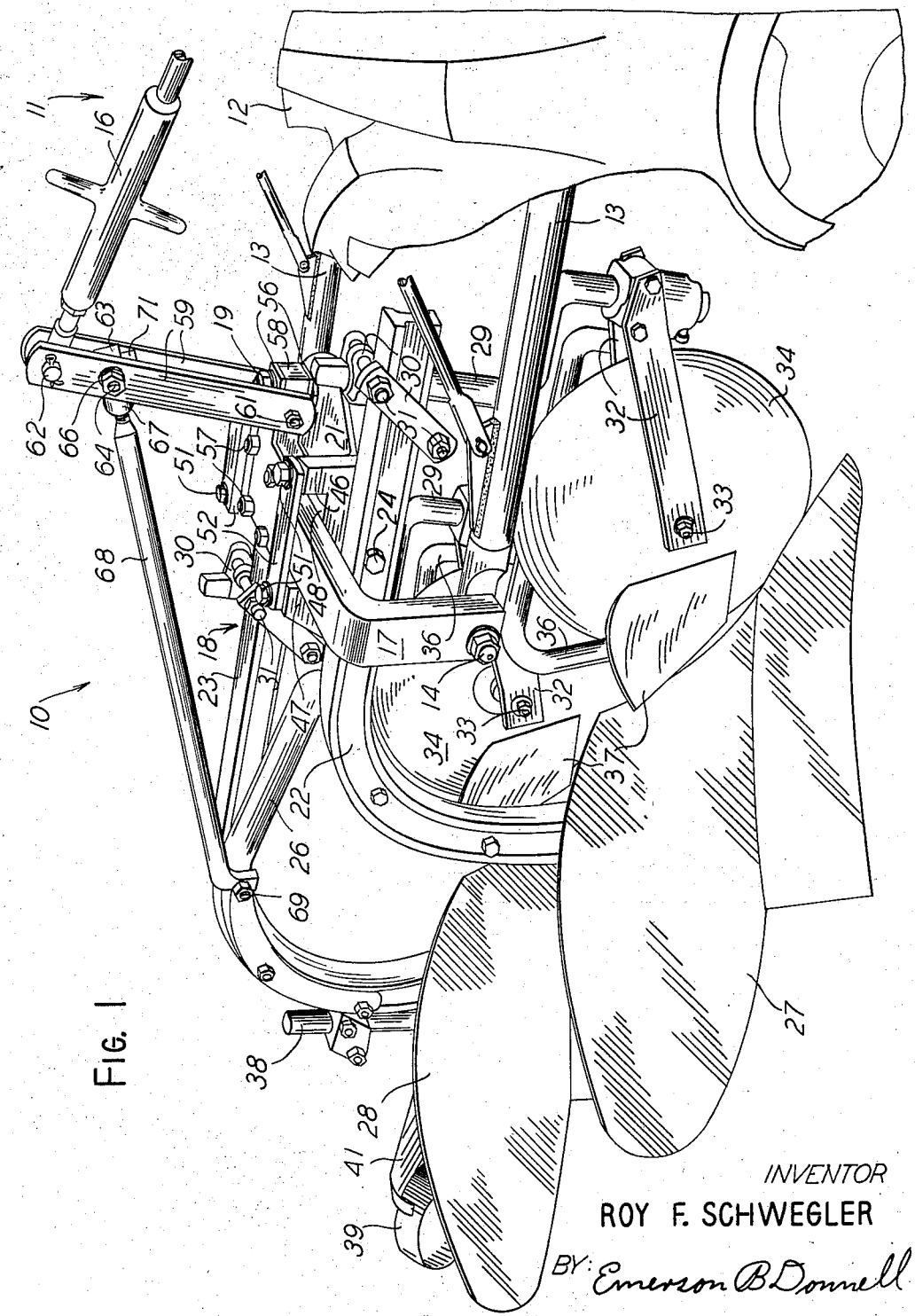

As shown in Fig. 1, a preferred embodiment of this invention consists of a plow, generally designated 10, and a tractor, generally designated 11. Since this invention can be described without reference to a complete draft vehicle, only a fragment of the tractor is shown. The tractor 11 is of a conventional type and includes rear wheels, such as the wheel 12, with a pair of horizontally rearwardly extending draft arms 13 which are suitably connected to the plow 10 through hitch pins, such as the pin 14. The tractor also contains a draft attachment turnbuckle 16 which connects to the plow to permit altering the depth of plowing by adjusting the length of the turnbuckle, all in a well known manner.

The hitch arms 13 attach to opposite ends of a drawbar 17 which is horizontally positioned, through its midsection, transversely to the line of movement of the tractor and plow. The ends of the drawbar 17 depend to connect through the pins 14 to the hitch arms as shown. In a preferred manner which will be fully explained later, the drawbar draft connects to a frame, generally designated 18, of the plow 10. The principle point of connection between the tractor and the plow frame 18 is through a vertically disposed bolt 19 located near the front of the plow.

The frame 18 consists of a horizontally disposed cross-member 21 which is shown to be connected by bolts 24 to a pair of spaced apart plow beams 22 and 23. It will be noted that the beam 22 is shorter than the beam 23 in their rearward extents, and the front ends thereof are offset. See Fig. 2. Also, a diagonally extending brace member 26 connects between the rear ends of the beams to form a part of the frame 18 and brace that portion thereof. The rear ends of the beams 22 and 23 are curved downwardly and respectively support plow bottoms 27 and 28 at the lower ends of the beams in any conventional manner of attachment such as riveting. Depending from the front ends of the beams 22 and 23 is a pair of bent arms or spindles 29 which are mounted thereon by suitable clamping plates 30 secured to the beams by bolts 31. Separately attached to the lower ends of the spindles 29 is a pair of rearwardly extending plates 32. The latter provides an axle bolt 33 upon which a coulter 34 is rotatably mounted for the purpose of working the soil in a conventional manner. Also attached to the lower ends of the arms 29 is a pair of support members 36 whose rearward ends carry scrapers 37 which are positioned adjacent one side of each of the coulters 34 to remove any soil which is clinging to the coulters. Also attached to the beam 23 at the rear end thereof is the usual axle 38 with the rotatably mounted furrow wheel 39 inclined to ride in the plowed furrow to resist the lateral thrust placed upon the plow bottoms by the earth. The wheel 39 is provided with a scraper 41 which remains in the position shown adjacent the periphery of the wheel to remove any soil from the wheel.

Most of the foregoing described parts are of a conventional type and no further description thereof is deemed to be necessary for an adequate understanding of them.

It will be further seen in Fig. 1 that the cross-member 21 contains four integral upright corner posts consisting of two front posts 46 and two rear posts 47 with a pair of flat horizontal surfaces 48 between each two front and rear posts. The surfaces 48 extend preferably only between the side limits of the side pairs of posts and are slightly higher than the top intermediate surface of the member 21. The four posts 46 and 47 are tapped vertically to contain screw threads which engage with four vertical bolts 51 to secure clamp plates 52 to the member 21 across the top of the side pairs of posts. With this arrangement it will be obvious that in a vertical plane an enclosed space is provided to receive the drawbar 17. The preferred relation between the drawbar and the surrounding members is such that the drawbar is free to slide horizontally within the space between aligned front and rear posts. Thus, the drawbar has a slight clearance in the vertical direction at its intermediate section which is between the plates 52 on the top and the surfaces 48 on the bottom. The construction on the opposite side of Fig. 1 is the same as that on the near side with respect to the mounting on the drawbar as just described.

Securely attached to the intermediate section of the drawbar is a pair of upper and lower plates 56 which are clamped onto the drawbar by bolts 57 to be horizontally disposed. The forward ends of the plates 56 confine a block 58 therebetween. The pivot bolt 19 passes vertically through the plates and the block as shown also in Fig. 4.

Fig. 1 further shows a pair of upright mast arms 59 which are pivotally attached by a horizontal bolt 61 to the block 58 to extend therefrom. The upper ends of the arms 59 are pivotally attached to the rearward end of the tractor turnbuckle 16 by a pin 62. Preferably intermediately on the arms 59, a block 63 is pivotally mounted by a pair of horizontally attached trunnions 64 passing through the arms 59. A nut 66 is preferably threadedly engaged with the projecting ends of the trunnions to secure the block 63 to the arms. Also, a bifurcated connector 67 engages the block in a manner described later. A mast brace 68 is preferably threaded to the connector 67 to extend to the rear end of the plow beam 23 to where a bolt 69 attaches it to the beam. At this time it should be noted, as shown in Figs. 2 and 3, the brace 68 is diagonally arranged to extend from a centered position on the connector 67 to a side position on the beam 23. Also, with the arrangement of the turnbuckle and the plow mast, adjustment of the turnbuckle will raise or lower the rear end of the plow about the hitch pins 14 and thereby regulate the plowing depth of the plow bottoms 27 and 28. The drawbar and the parts attached thereto as just described constitute the draft portion of the plow.

Figs. 2, 4, and 5 show in detail the preferred construction of securing the mast brace 68 to the mast arms 59 and also of attaching the drawbar 17 to the plow frame 18 through the bolt 19. As previously described, the block 63 is attached to the arms 59 through the block's trunnions 64. The trunnions provide a horizontally disposed pivot axis for the block which then permits the brace or frame member 68 to be vertically pivotally attached to the arms 59. The connector 67 is preferably bifurcated with an upper and lower arm 71 extending therefrom to be disposed over the top and the bottom surface of the block 63. The arms 71 and the block 63 contain aligned holes which receive a bolt or pin 72, as shown in Fig. 4. In this preferred manner, the brace 68 is attached to the arms 59 to be pivotal thereto about the pin 72 as well as about the trunnions 64. This forms a connection having the characteristics of a universal joint.

The lower ends of the arms 59 are attached to the plow frame 18 at the cross-member 21 by the vertically disposed bolt 19. The plates 56 and the block 58, the latter being attached to the arms 59 by the bolt 61, have aligned vertical holes which align with a hole in the member 21. As shown in Fig. 4, the bolt 19 passes through these holes to effect the connection. Also, a spacer nut 73 is preferably provided between the bottom plate 56 and the top of member 21. With this construction, the member 21 is pivotal, about the vertical pivot bolt 19, with respect to the plates 56 and the attached drawbar 17.

The construction shown in Fig. 4 thus provides a vertical axis of pivot through the axis of the bolt 19 and the attachment of the connector 67 with the pin 72. Fig. 6 is a top plan view which shows the manner in which the plow frame 18 pivots with respect to the drawbar 17. The limit of the pivot in either direction about the vertical pivot axis described is governed by posts 46 and 47 which would abut the drawbar 17 in the limit of the pivot of the frame 18.

The rear view of Fig. 3 best shows that the drawbar 17 is vertically spaced from the top of member 21 and the drawbar is not in contact with the member 21 except at the two areas between each of the front posts 46 and the immediate rear posts 47.

While a specific embodiment of this invention has been shown and described, the scope of the invention should be limited only by the appended claims.

I claim:

1. A tractor conveyed swivel type plow comprising in combination a plow frame, plow bottoms attached to said frame to depend therefrom, a laterally rigid rearwardly extending plow draft assembly carried on the tractor, a pivot member attached between said plow frame and said draft assembly forwardly of said plow bottoms and rearwardly of said tractor to draft connect therebetween and permit said plow to swivel with respect to said tractor, abutment surfaces positioned on said plow frame and said draft assembly to engage upon maximum swivel action of said plow and thereby limit the swivel thereof, clamping means secured in one position on said draft assembly and selectively positionable in other positions laterally relatively to said draft assembly, said pivot member being carried by said clamping means, a mast mounted on said draft assembly to extend thereabove, a connector pivotally attached to said mast approximately directly above said pivot member, and a brace attached at one end to said connector and at the other end to said plow.

2. In a tractor mounted plow the combination with a tractor having a rear axle, of a rearward extension on the tractor comprising a pair of laterally spaced laterally rigid vertically swingable links, a plow frame, a cross bar on the plow frame spaced backwardly from said rear axle, disengageable interlocking means connecting the cross bar with said links, said plow frame being disposed in part rearwardly of said cross bar, clamping means secured in one position on said cross bar and selectively positionable in other positions along said cross bar, a pivotal connection between said clamping means and said plow frame spaced rearwardly of said rear axle and constituted for side-to-side swinging of said plow frame relatively to said rearward extension, a plow bottom on said frame in position to work the ground and spaced rearwardly from said pivotal connection, and said clamping means providing for adjusting said pivotal connection laterally relatively to said cross bar for aligning the plow in desired relation with the tractor.

3. In a tractor mounted plow the combination with a tractor having a rear axle, of a rearward extension on the tractor comprising a pair of laterally spaced laterally rigid vertically swingable links, a plow frame, a cross bar on the plow frame spaced backwardly from said rear axle, disengageable interlocking means connecting the cross bar with said links, means for raising and lowering said links, said plow frame being disposed in part rearwardly of said cross bar, clamping means secured in one position on said cross bar and selectively positionable in other positions along said cross bar, a pivotal connection between said clamping means and said plow frame spaced backwardly from said rear axle and constituted for side-to-side swinging of said plow frame relatively to said rearward extension, a plow bottom on said frame in position to work the ground and spaced rearwardly from said pivotal connection, and said clamping means providing for adjusting said pivotal connection laterally relatively to said cross bar for aligning the plow in desired relation with the tractor.

4. In a tractor mounted plow the combination with a tractor having a rear axle, of a rearward extension on the tractor comprising a pair of laterally spaced laterally rigid vertically swingable links, a plow frame, a cross bar on the plow frame spaced backwardly from said rear axle, disengageable interlocking means connecting the cross bar with said links, said plow frame being disposed in part rearwardly of said cross bar, clamping means secured in one position on said cross bar and selectively positionable in other positions along said cross bar, a pivotal connection between said clamping means and said plow frame spaced backwardly from said rear axle and constituted for side-to-side swinging of said plow frame relatively to said rearward extension, a plow bottom on said frame in position to work the ground and spaced rearwardly from said pivotal connection, a mast structure projecting upwardly in relation to said plow frame and rearward extension, linkage connecting the upper end of said mast with the rear of said plow frame and with said tractor, pivot means at said upper end providing for free side-to-side swinging of said plow frame relatively to said rearward extension and said clamping means providing for adjusting said pivotal connection laterally relatively to said cross bar for aligning the plow in desired relation with the tractor.

(References on following page)

References Cited in the file of this patent

UNITED STATES PATENTS

| | | | |
|---|---|---|---|
| 2,442,458 | Ferguson | June 1, | 1948 |
| 2,618,211 | Fraga | Nov. 18, | 1952 |
| 2,619,019 | Temple et al. | Nov. 25, | 1952 |
| 2,622,349 | Kinnan | Dec. 23, | 1952 |
| 2,622,749 | Stuhr | Dec. 23, | 1952 |
| 2,672,801 | Barrett | Mar. 23, | 1954 |
| 2,710,569 | Altgelt | June 14, | 1955 |

FOREIGN PATENTS

| | | | |
|---|---|---|---|
| 72,623 | Denmark | June 11, | 1951 |
| 1,013,199 | France | Apr. 30, | 1952 |